United States Patent
Bungenstock et al.

(10) Patent No.: US 11,719,405 B2
(45) Date of Patent: Aug. 8, 2023

(54) LIGHTING DEVICE FOR VEHICLES

(71) Applicant: HELLA GmbH & Co. KGaA, Lippstadt (DE)

(72) Inventors: Carmen Bungenstock, Kleinenberg (DE); Gerhard Kloos, Erwitte (DE); Alfons Puls, Soest (DE); Philip Stroop, Schloss Holte-Stukenbrock (DE); Benjamin Willeke, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/993,554

(22) Filed: Nov. 23, 2022

(65) Prior Publication Data

US 2023/0160552 A1 May 25, 2023

(30) Foreign Application Priority Data

Nov. 24, 2021 (DE) .......................... 102021130729.5

(51) Int. Cl.
*F21S 41/365* (2018.01)
*B60Q 1/14* (2006.01)
*B60Q 1/068* (2006.01)
*F21W 102/15* (2018.01)

(52) U.S. Cl.
CPC ............ *F21S 41/365* (2018.01); *B60Q 1/068* (2013.01); *B60Q 1/1423* (2013.01); *F21W 2102/15* (2018.01)

(58) Field of Classification Search
CPC ...... F21S 41/365; B60Q 1/068; B60Q 1/1423
See application file for complete search history.

(56) References Cited

U.S. PATENT DOCUMENTS 6,547,423 B2 * 4/2003 Marshall ............... F21V 7/0091
362/255
7,841,750 B2 * 11/2010 Wilcox .............. G02B 19/0071
362/311.06

(Continued)

FOREIGN PATENT DOCUMENTS

DE    202012004722 U1    10/2012
DE    102017213516 A1    2/2019

(Continued)

*Primary Examiner* — Bryon T Gyllstrom
(74) *Attorney, Agent, or Firm* — Muncy, Geissler, Olds & Lowe, P.C.

(57) ABSTRACT

A lighting device having a light source, an optical element associated with the light source and designed as a reflection lens which, in a central region accommodating an optical axis of the optical element, has a lens section which has a first coupling-in surface on a coupling-in side and a first coupling-out surface on a coupling-out side. The light source is tilted and/or is arranged rotated about the optical axis in the plane running perpendicular to the optical axis, with the formation of an obliquely running edge of the light source, and the first coupling-in surface, the second coupling-in surface, the reflection surface, the first coupling-out surface, and/or the second coupling-out surface of the optical element are shaped in such a way that the predetermined light distribution is produced with imaging of the edge of the light source as a cut-off line.

14 Claims, 3 Drawing Sheets

(56) References Cited

U.S. PATENT DOCUMENTS

| | | | |
|---|---|---|---|
| 7,901,108 B2* | 3/2011 | Kabuki | H01L 33/58 |
| | | | 362/334 |
| 2011/0320024 A1* | 12/2011 | Lin | F21V 5/007 |
| | | | 703/2 |
| 2012/0002414 A1* | 1/2012 | Gould | F21V 27/00 |
| | | | 362/330 |
| 2014/0085919 A1 | 3/2014 | Tsai et al. | |
| 2018/0073699 A1 | 3/2018 | Sun et al. | |

FOREIGN PATENT DOCUMENTS

| | | |
|---|---|---|
| DE | 102019118051 A1 | 1/2021 |
| EP | 3540295 A1 | 9/2019 |

* cited by examiner

LIGHTING DEVICE FOR VEHICLES

This nonprovisional application claims priority under 35 U.S.C. § 119(a) to German Patent Application No. 10 2021 130 729.5, which was filed in Germany on Nov. 24, 2021, and which is herein incorporated by reference.

BACKGROUND OF THE INVENTION

Field of the Invention

The present invention relates to a lighting device for vehicles having a light source, having an optical element which is associated with the light source and which is designed as a reflection lens which, in a central region accommodating an optical axis of the optical element, has a lens section which has a first coupling-in surface on a coupling-in side and a first coupling-out surface on a coupling-out side, wherein light coupled in at the first coupling-in surface can be guided directly to the first coupling-out surface, and which has, in an outer region, a reflection section which has a second coupling-in surface on a coupling-in side and a second coupling-out surface on a coupling-out side, wherein light coupled in at the second coupling-in surface can be guided to the second coupling-out surface via a reflection surface of the optical element.

Description of the Background Art

A lighting device for vehicles having a light source and an optical element is known from DE 10 2019 118 051 A1, wherein the optical element has a reflection section, on the one hand, and a lens section, on the other hand. The reflection section is located behind the lens section in the main emission direction. In an intermediate region between the reflection section and the lens section, an imaging edge generated by lasering is introduced, which is imaged to a cut-off line of a light distribution by means of the lens section. A disadvantage of the known optical element is that it has a relatively large overall depth.

A lighting device for vehicles having a light source and an optical element is known from DE 10 2017 213 516 A1, wherein the optical element is designed as a reflection lens having a reflection section and a lens section. The lens section is located in a central region of the optical element and the reflection section is located in an outer region of the optical element. A coupling-out surface of the reflection section directly adjoins a coupling-out surface of the lens section. The reflection section has a reflection surface on which coupled-in light is totally reflected in the main emission direction. The optical element is formed substantially rotationally symmetric. The light source is arranged on an optical axis of the optical element and arranged oriented in the main emission direction of the lighting device. The lighting device does not have means to image a cut-off line for a light distribution.

SUMMARY OF THE INVENTION

It is therefore an object of the present invention to provide a lighting device for vehicles containing a reflection lens in such a way that a high light efficiency is provided for a light distribution with a cut-off line in a space-saving manner.

To achieve the object, the invention in an exemplary embodiment, provides that the light source is tilted with respect to an axis of rotation running perpendicular to the optical axis and/or is arranged rotated about the optical axis in the plane running perpendicular to the optical axis, with the formation of an obliquely running edge of the light source, and in that the first coupling-in surface, the second coupling-in surface, the reflection surface, the first coupling-out surface, and/or the second coupling-out surface of the optical element are shaped in such a way that the predetermined light distribution is produced with imaging of the edge of the light source as a cut-off line.

A first coupling-in surface, a second coupling-in surface, a reflection surface, a first coupling-out surface, and/or a second coupling-out surface of the reflection lens can be formed non-rotationally symmetrically such that the light emitted from a tilted and/or rotated light source is imaged according to the predetermined light distribution with a cut-off line. Advantageously, a light distribution can be generated in a simple way without the need for further components, in particular a shading element for imaging the cut-off line. The tilted or rotated arrangement of the light source in conjunction with the aforementioned surfaces of the reflection lens can significantly increase the light yield. The light efficiency can be at least 60%, preferably 70% to 80%. This means that at least 60% of the luminous flux emitted by the light source is coupled out at the light exit side of the optical element.

A lens section and/or a reflection section of the optical element may not be formed rotationally symmetric. In particular, the lens section and the reflection section can be formed extended in a plane running perpendicular to the optical axis of the optical element, preferably in the horizontal direction. Thus, an upper and a lower part of the reflection surface are larger than a left and a right part of the reflection surface. The coupling-in surface and the coupling-out surface of the lens section are preferably formed oval-shaped in cross section. Advantageously, this can produce a relatively broad light distribution, which is preferably used to illuminate a forefield of the headlight.

An upper part and a lower part of the reflection surface can be formed with different parabolic shapes. The light source is tilted upward by an acute angle so that essentially the upper part of the reflection surface is captured. This makes it possible to generate a relatively broad distribution below a zero line of the light distribution.

A recess can be provided in an upper region of the reflection section, namely, in a reflection surface end region facing the optical axis. This recess causes the edge of the light source to be sharply imaged as the cut-off line of the light distribution. This recess prevents part of the light emitted by the light source from hitting the upper part of the reflection surface, and thereby leading to a softening of the cut-off line, in particular to the imaging of a light component above the desired cut-off line. Advantageously, a central region of the cut-off line between −5° and +5° in the horizontal can be sharply imaged.

The lens section and/or the rotation section can be formed rotationally symmetric, wherein the optical element is formed cut off above the lens section. As a result, the upper part of the reflection surface is smaller than the lower part of the same. Because the light source is tilted downward, namely, in the direction of the lower part of the reflection surface, mainly only the lower part of the reflection surface is used for total reflection. Advantageously, this can produce a long-range light distribution with essentially light emission above a zero line. By rotating the light source about the optical axis, the slope of the cutoff line can also be adjusted, wherein the angular position of the upper edge of the light source defines the cut-off line.

The lens section and/or the reflection section can be formed rotationally symmetric. The light source is arranged oriented in the direction of the optical axis so that a symmetric light distribution, in particular a high beam distribution, can be generated hereby with respect to a vertical line.

The lighting device can have three light modules each containing a light source and an optical element. A high beam light module has substantially a rotationally symmetric lens section and a reflection section, wherein the light source is arranged oriented in the direction of the optical axis. A long-range light module has a substantially rotationally symmetric lens section and reflection section, wherein the reflection section is formed cut off above the lens section. By orienting the light source in the direction of the reflection section below an optical axis, most of the coupled-out light is coupled out after total reflection at the reflection surface above a horizontal line, so that a long-range light distribution is produced. A forefield light module is formed substantially of a lens section extended in the horizontal direction and an extended reflection section. The light source is designed tilted. In this way, a forefield light distribution can be generated in which the light is mainly coupled out under a horizontal plane. A low-beam distribution can be generated by superimposing the forefield and long-range light distribution. A high-beam distribution can be generated by additionally turning on the high beam module. Advantageously, the three light modules can be used to construct a completely functional headlight which has a small overall depth and requires little installation space. The optical elements are each designed as a single piece and enable efficient light control with a high optical efficiency.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 20 shows a schematic representation of a light distribution with the forefield and long-range light module turned on.

DETAILED DESCRIPTION

Figure 1:
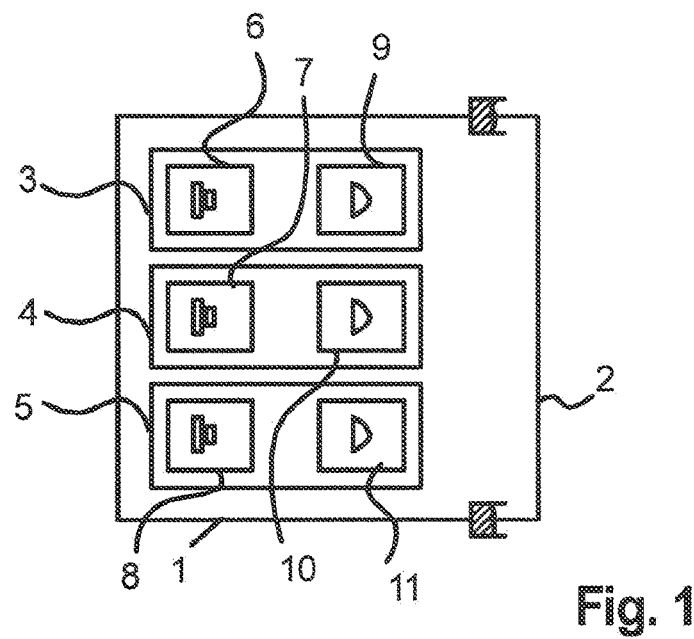
FIG. 1 shows a schematic representation of a headlight with three light modules.
Figures 2, 3, 4:
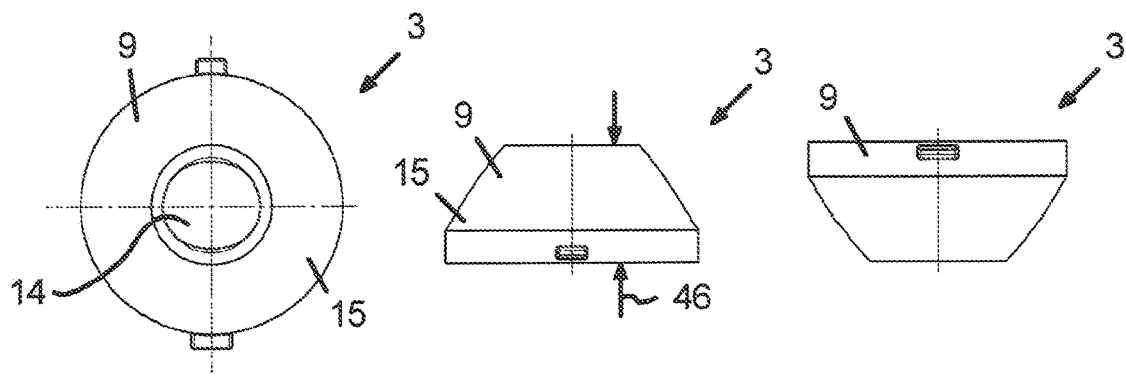
FIG. 2 shows a front view of an optical element of a high beam module.
FIG. 3 shows a top view of the optical element of the high beam module.
FIG. 4 shows a bottom view of the optical element of the high beam module.
Figure 5:
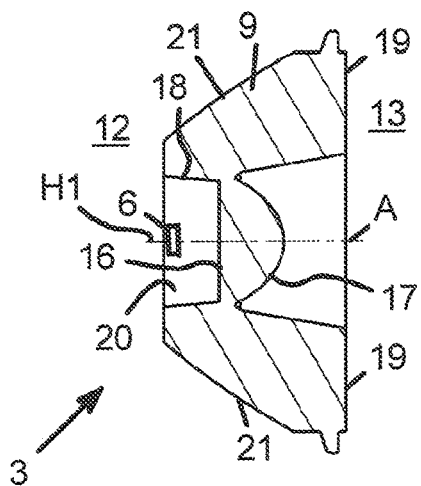
FIG. 5 shows a vertical cross section of the optical element from FIG. 2.
Figure 6:
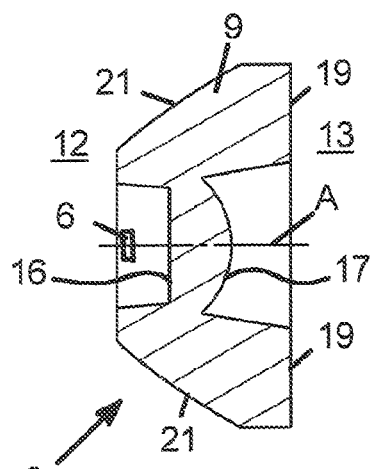
FIG. 6 shows a horizontal cross section of the optical element along the optical element of the high beam module along from FIG. 2.
Figure 7:
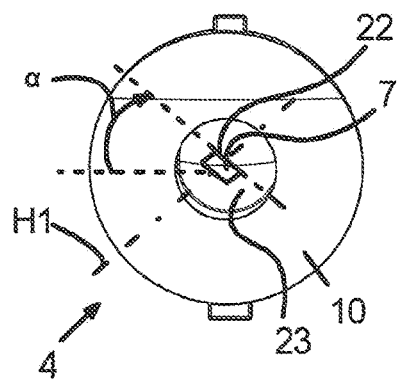
FIG. 7 shows a front view of an optical element of the long-range light module.
Figure 8:
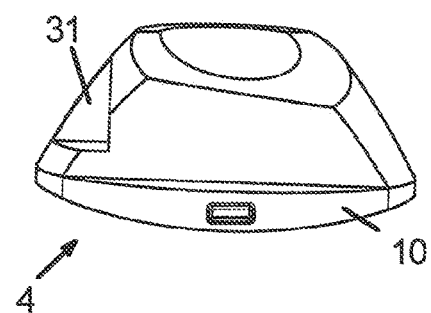
FIG. 8 shows a top view of the optical element of a long-range light module according to FIG. 7.
Figure 9:
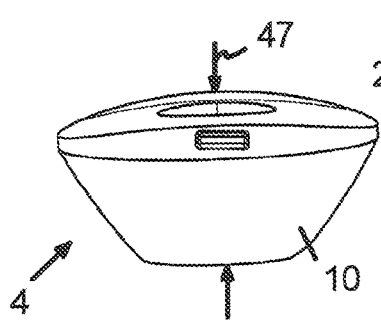
FIG. 9 shows a bottom view of the optical element of a long-range light module according to FIG. 7.
Figure 10:
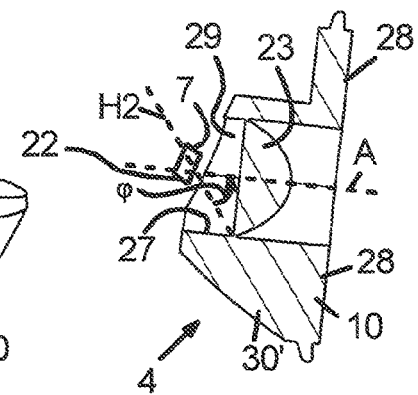
FIG. 10 shows a vertical cross-section of the optical element from FIG. 7.
Figure 11:
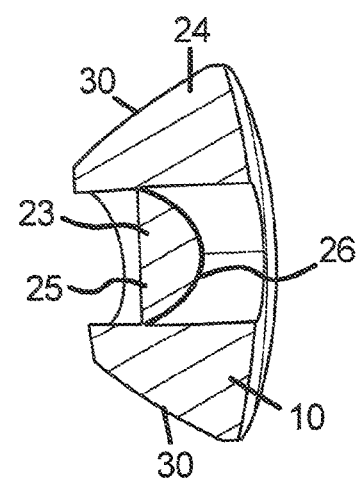
FIG. 11 shows a horizontal cross-section of the optical element from FIG. 7.
Figure 12:
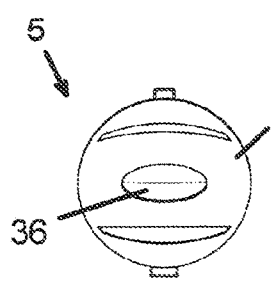
FIG. 12 shows a front view of an optical element of a forefield light module.
Figure 13:
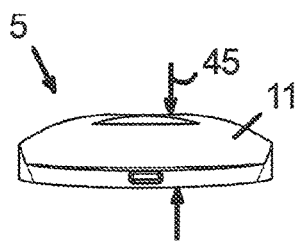
FIG. 13 shows a top view of the optical element of a long-range light module according to FIG. 12.
Figure 14:
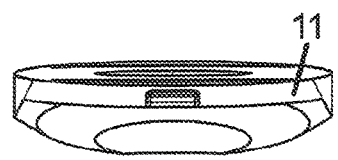
FIG. 14 shows a bottom view of the optical element of a long-range light module according to FIG. 12.
Figure 15:
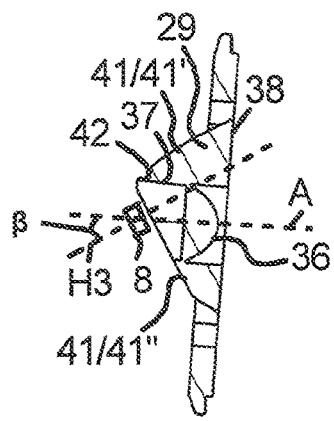
FIG. 15 shows a vertical cross section of the optical element from FIG. 12.
Figure 16:
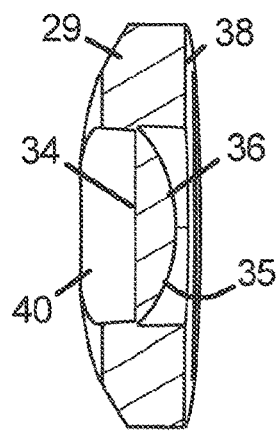
FIG. 16 shows a horizontal cross section of the optical element from FIG. 12.

The lighting device for vehicles is designed as a headlight with a housing 1 and with a transparent cover plate 2 closing an opening of housing 1. Cover plate 2 is preferably formed crystal clear.

Three light modules are arranged within housing 1. On the one hand, a high beam module 3, on the other hand, a long-range light module 4, and furthermore a forefield light module 5 are provided.

Light modules 3, 4, 5 each have a light source 6, 7, 8 and an optical element 9, 10, 11. Optical elements 9, 10, 11 are each formed in one piece. They are each designed as reflection lenses in which light, on the one hand, is imaged by a lens section and, on the other hand, is totally reflected by means of a reflection section within optical element 9, 10, 11 and is coupled out into a coupling-out surface arranged adjacent to the lens section.

Optical elements 9, 10, 11 each have a coupling-in side 12 and a coupling-out side 13. Coupling-in side 12 is formed on a side facing light source 6, 7, 8. Coupling-out side 13 is arranged in front of coupling-in side 12 in the main emission direction H of the headlight. The lens section of optical elements 9, 10, 11 is arranged in a central region of optical element 9, 10, 11. The reflection section is arranged in an outer region of optical element 9, 10, 11. Thus, the lens section is arranged in a region close to an optical axis A of optical element 9, 10, 11, and the reflection section is arranged in a region far from the optical axis A.

Figure 17:
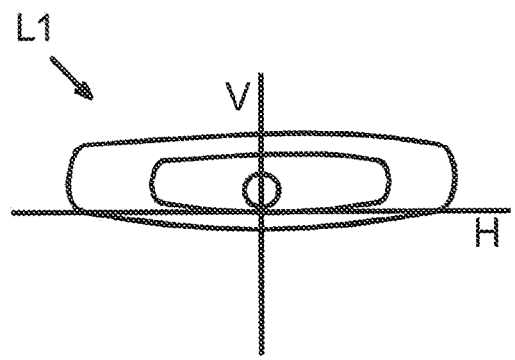
FIG. 17 shows a schematic light distribution of the high beam module.

High beam module 3 is used to generate a high beam distribution according to FIG. 17. High beam module 3 has light source 6 arranged on the optical axis A and aligned oriented in the direction of optical element 9. A main axis H1 of the light source 6 runs in the direction of the optical axis A.

Optical element 9 of high beam module 3 is formed substantially rotationally symmetric. It has a lens section 14 in the central region and a reflection section 15 in an outer region. Lens section 14 is arranged rotationally symmetric to the optical axis A. Lens section 14 intersects the optical axis A and is located in a region close to the optical axis A.

Reflection section 15 is located in a region remote from the optical axis A and does not intersect the optical axis A.

Lens section 14 is formed as a plano-convex lens having a planar first coupling-in surface 16 and a convex first coupling-out surface 17. Reflection section 15 directly adjoins lens section 14 transversely to the optical axis A. Reflection section 15 has a second coupling-in surface 18 and a second coupling-out surface 19. Optical element 9 has an indentation 20 on coupling-in side 12, so that the second coupling-in surface 18 is parallel and/or slightly inclined to the optical axis A. Indentation 20 can be conical or cylindrical. A lateral surface of indentation 20 serves here as a second coupling-in surface 18 of optical element 9.

Reflection section 15 has an arc-shaped reflection surface 21 which widens in the main emission direction H and can be formed, for example, in the shape of a paraboloid or as a free-form surface. Light coupled in at the second coupling-in surface 18 of reflection section 15 is reflected at reflection surface 21 and coupled out at the second coupling-out surface 19. Preferably, there is only one total reflection of the light rays at reflection surface 21.

By superimposing the light coupled out at the first coupling-out 17 and at the second coupling-out surface 19 of optical element 9, the high beam distribution according to FIG. 17 is generated.

Long-range light module 4 has light source 7 and optical element 10. Light source 7 is arranged tilted about an axis of rotation running perpendicular to the optical axis A. In the present exemplary embodiment, the axis of rotation runs in the horizontal direction. Light source 7 is arranged inclined forward by an acute angle φ, so that a main axis H2 of light source 7 in the region of optical element 10 runs vertically below the optical axis A.

Figure 18:
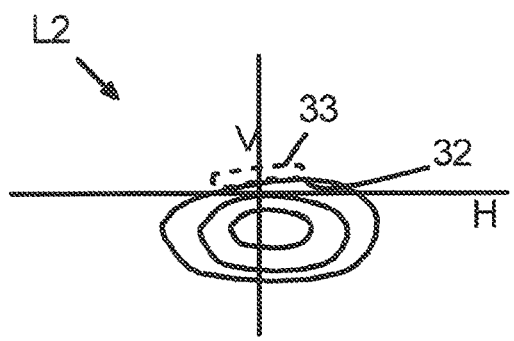
FIG. 18 shows a schematic light distribution of the long-range light module.

In addition, light source 7 is arranged in the plane running perpendicular to the optical axis A and rotated at an angle α, for example, by 15°, which images the angle of cut-off line 32 in light distribution L2 generated by long-range light module 4 according to FIG. 18. Cut-off line 32 is created by imaging an edge 22 of light source 7.

Optical element 10 has a central lens section 23 and a reflection section 24 adjoining lens section 23 transversely to the optical axis A. In lens section 23, optical element 10 has a first coupling-in surface 25 and a first coupling-out surface 26. First coupling-in surface 25 is planar and first coupling-out surface 26 is formed convex. Further, optical element 10 comprises a second coupling-in surface 27 and a second coupling-out surface 28 in the region of reflection section 24. Second coupling-in surface 27 is part of an indentation 29 of optical element 10. In contrast to optical element 9 of high beam module 3, optical element 10 is formed cut off on an upper side when viewed vertically. An upper part of a reflection surface 30 is formed smaller than a lower part 30' of the reflection surface. The tilt angle α reproduces the slope of cut-off line 32 in light distribution L2 according to FIG. 18.

Light source 7 is arranged oriented to the lower part 30' of reflection surface 30, so that by means of lower part 30' of reflection surface 30 a main part of the light component totally reflected within optical element 10 is guided to second coupling-out surface 28 of optical element 10.

Second coupling-out surface 28 of optical element 10 can be formed planar, arcuate, or as a free-form surface.

In an upper region of optical element 9, the latter has a recess 31. Recess 31 is arranged on a left and/or right side, as viewed in the main emission direction H, and causes a cutoff-line 32 of light distribution L2 to be sharp. Recess 31 ensures that light components are not reflected, which would otherwise lead to flocking 33 (shown as a dashed line in FIG. 18) of the cut-off line 32 with undesired light components.

As can be seen in FIG. 18, long-range light distribution L2 runs substantially below a horizontal line.

Like long-range light module 4, forefield light module 5 has a light source 8 which is formed tilted by an angle β with respect to an axis of rotation that runs perpendicular to the optical axis A. A main axis H3 of light source 8 is tilted upward in the vertical direction, so that the main axis H3 runs exclusively in the region of optical element 11 above the optical axis A.

Optical element 11 of forefield light module 5 has a first coupling-in surface 34 and a first coupling-out surface 35 of a lens section 36 in the central region. Further, optical element 11 comprises, in an outer region, a second coupling-in surface 37 and a second coupling-out surface 38 of a reflection section 29.

Lens section 36 and reflection section 39 are not formed rotationally symmetric. They are formed extended in one direction, namely, preferably in the horizontal direction. First coupling-in surface 34 and first coupling-out surface 35 of lens section 36 thus run in an oval shape in a plane perpendicular to the optical axis A.

Second coupling-in surface 37 of optical element 11, as in the preceding optical elements, is a lateral surface of an indentation 40. Reflection section 39 has a reflection surface 41 whose upper part 41' has a different parabolic shape than a lower part 41" of reflection surface 41. The upper part of reflection surface 41 extends above the optical axis A. The lower part of reflection surface 41" extends below the optical axis A. The upper part 41 and the lower part 41" of reflection surface 41 are preferably each formed parabolic in shape.

In the upper region of optical element 11, a recess 42 is provided at a lateral edge, in the area of which no total reflection can occur at reflection surface 41. This has the effect that optical element 11 produces a sharp cut-off line 43 without undesirable softening or flocking 44 of light distribution L3 by light components of lower illuminance that form above cut-off line 43 (dashed line in FIG. 19). Like recess 31 of long-range light module 4, recess 42 of forefield light module 5 is located above the optical axis A. Edge 22 of light source 8 is imaged to cut-off line 43 of light distribution L2.

An overall depth 45 of optical element 11 is smaller than an overall depth 46 of optical element 9 of long-range light module 3 and an overall depth 47 of optical element 10 of long-range light module 4.

Figure 19:
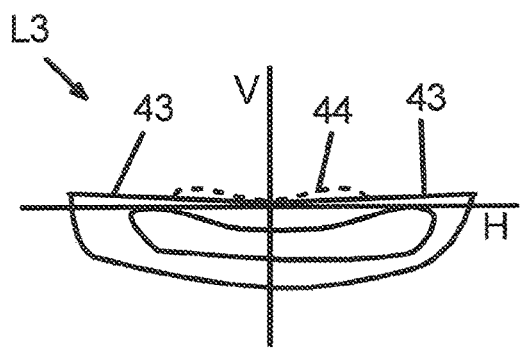
FIG. 19 shows a schematic light distribution of the forefield light module.

As can be seen in FIG. 19, light distribution L3 of forefield light module 5 runs substantially symmetrically and below a horizontal zero line with a relatively wide dispersion for illuminating a forefield of the vehicle.

It should be noted that first coupling-out surface 25, 34 of optical element 10 and/or 11 can be formed aspherical.

First coupling-out surface 17 of optical element 9 is preferably made anamorphic with aspherical surfaces that differ from one another in the horizontal and vertical directions.

Figure 20:
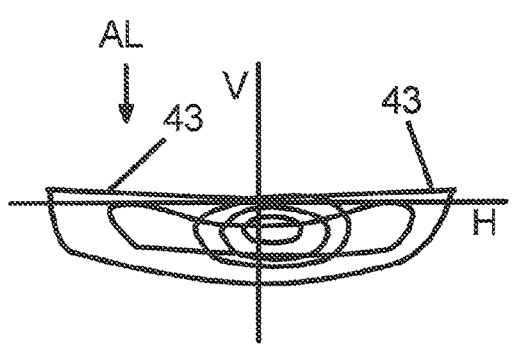

To generate a low beam distribution AL according to FIG. 20 with a cut-off line, light source 7 of long-range module 4 and light source 8 of forefield light module 5 are turned on, so that light distributions L2 and L3 are superimposed to form the low beam distribution according to FIG. 20.

If light source 6 of high beam module 3 is also turned on, a high beam distribution can be generated.

Light sources 6, 7, 8 are preferably formed as LED light sources.

Optical elements 8, 10, 11 are preferably formed from a polycarbonate (PC) or a polymethyl methacrylate (PMA) or silicone.

Second coupling-out surface 19, 28, 38 of optical element 9, 10, 11 can be provided on the surface with micro-optical elements and cylindrical surface sections.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a vehicle, the lighting device comprising:
    a light source;
    an optical element associated with the light source and designed as a reflection lens, which, in a central region accommodating an optical axis of the optical element, has a lens section that has a first coupling-in surface on a coupling-in side and a first coupling-out surface on a coupling-out side,
    wherein light coupled in at the first coupling-in surface is adapted to be guided directly to the first coupling-out surface, and which has, in an outer region, a reflection section that has a second coupling-in surface on an coupling-in side and a second coupling-out surface on a coupling-out side, wherein light coupled in at the second coupling-in surface is adapted to be guided to the second coupling-out surface via a reflection surface of the optical element,
    wherein the light source is tilted with respect to an axis of rotation running substantially perpendicular to the optical axis and/or is arranged rotated about the optical axis in the plane running substantially perpendicular to the optical axis, with the formation of an obliquely running edge of the light source, and
    wherein the first coupling-in surface, the second coupling-in surface, the reflection surface, the first coupling-out surface, and/or the second coupling-out surface of the optical element are shaped such that the predetermined light distribution is produced with imaging of the edge of the light source as a cut-off line.

2. The lighting device according to claim 1, wherein the first coupling-in surface of the optical element is planar and the first coupling-out surface thereof is formed convex.

3. The lighting device according to claim 1, wherein the second coupling-in surface of the optical element is formed as a lateral surface of a conical or cylindrical indentation tapering in the main emission direction.

4. The lighting device according to claim 1, wherein the second coupling-out surface of the optical element is planar and/or a surface of the same is provided with micro-optical elements or cylindrical surface sections.

5. The lighting device according to claim 1, wherein the lens section and/or the reflection section are not formed rotationally symmetric.

6. The lighting device according to claim 1, wherein the reflection section has a recess such that an edge of the reflection surface reflects the light that is imaged to the cut-off line, and wherein the edge is adjacent to the recess.

7. The lighting device according to claim 1, wherein the lens section and the reflection section are formed extended in a plane running substantially perpendicular to the optical axis.

8. The lighting device according to claim 1, wherein an upper part of the reflection surface and a lower part of the reflection surface are formed with different parabolic shapes.

9. The lighting device according to claim 1, wherein the recess is arranged on a half of the reflection section, the half extending above the optical axis.

10. The lighting device according to claim 1, wherein the first coupling-out surface of the optical element is aspherical.

11. The lighting device according to claim 1, wherein the first coupling-out surface is made anamorphic with an aspherical surface different in horizontal and vertical direction.

12. The lighting device according to claim 1, wherein the lower part of the reflection surface is formed tilted about a transverse axis running transverse to the optical axis.

13. The lighting device according to claim 1, wherein a long-range light module and a forefield light module are provided for generating a low beam distribution, wherein the long-range light module has the light source which is arranged tilted downward in the vertical direction by an acute angle and the optical element is formed cut off on an upper side, and wherein the forefield light module has a light source tilted upward in the vertical direction, and an optical element formed extended in the horizontal direction.

14. The lighting device according to claim 1, wherein, to generate a high beam distribution, the long-range light module and the forefield light module as well as a high beam module are provided, which has a light source aligned in a direction of the optical axis and an optical element that has a rotationally symmetric lens section and reflection section.

* * * * *